(12) United States Patent
Leek et al.

(10) Patent No.: US 6,840,020 B2
(45) Date of Patent: Jan. 11, 2005

(54) VALLEY TRUSS CLIP

(75) Inventors: William F. Leek, Carmel, CA (US); Kevin F. Dill, Columbus, OH (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 0 days.

(21) Appl. No.: 10/000,106

(22) Filed: Oct. 30, 2001

(65) Prior Publication Data

US 2003/0079433 A1 May 1, 2003

(51) Int. Cl.$^7$ ................................................. E04B 1/38
(52) U.S. Cl. ........................... 52/712; 52/90.1; 52/643; 403/232.1
(58) Field of Search .......................... 52/702, 712, 715, 52/90.1, 92.2, 91.3, 643; 403/232.1

(56) References Cited

U.S. PATENT DOCUMENTS

| | | | |
|---|---|---|---|
| 2,666,238 A | | 1/1954 | Hagedorn |
| 3,420,019 A | | 1/1969 | Padilla |
| 3,481,635 A | * | 12/1969 | Tracy ............................. 403/3 |
| 3,596,941 A | * | 8/1971 | Tracy ........................... 403/27 |
| 3,727,358 A | | 4/1973 | Howell |
| 3,989,398 A | | 11/1976 | Wendt |
| 4,230,416 A | | 10/1980 | Gilb |
| 4,291,996 A | | 9/1981 | Gilb |
| 4,410,294 A | * | 10/1983 | Gilb et al. ..................... 403/27 |
| 4,413,456 A | | 11/1983 | Gilb |
| 4,414,785 A | * | 11/1983 | Howell ....................... 52/169.1 |
| 4,423,977 A | * | 1/1984 | Gilb ......................... 403/232.1 |
| 4,498,801 A | | 2/1985 | Gilb |
| 4,560,301 A | | 12/1985 | Gilb |
| 4,897,979 A | | 2/1990 | Colonias ...................... 52/643 |
| 4,932,173 A | | 6/1990 | Commins |

(List continued on next page.)

FOREIGN PATENT DOCUMENTS

| | | |
|---|---|---|
| DE | 9218001.9 | 5/1993 |
| FR | 2105002 | 9/1970 |
| GB | 1179267 | 1/1970 |

OTHER PUBLICATIONS

Kevin F. Dill, "Declaration of Kevin Dill Regarding Prior Art and Possible Statutory Bars," Total of 4 pages., (Mar. 12, 2004).

(List continued on next page.)

Primary Examiner—Brian E. Glessner
(74) Attorney, Agent, or Firm—Charles R. Cypher; James R. Cypher (57) ABSTRACT

A connection between a first structural member and a second structural member. The second structural member has a bottom surface that lies adjacent the first structural member, and the bottom surface is formed with opposed side surfaces 27 and 28. A connector attaches the second structural member to the first structural member in combination with fasteners 13, and is formed with a base member, and the base member receives a select number of the fasteners which are also received by the first structural member, making a positive attachment between the connector and the first structural member. The connector 1 is also formed with opposed side flanges that are disposed laterally of the base member and connect to the base member along parallel bend lines. The side flanges receive a select number of the fasteners which are also received by the second structural member, making a positive attachment between the connector and the second structural member. The side flanges register with the opposed side surfaces of the second structural member, and the second structural member is disposed so that only one of the opposed, elongated edges of the bottom surface of the second structural member contacts the base member adjacent one of the bend lines separating the base member from the side flanges.

31 Claims, 7 Drawing Sheets

U.S. PATENT DOCUMENTS

| | | | |
|---|---|---|---|
| 4,964,253 A | * 10/1990 | Loeffler | 52/289 |
| 4,995,206 A | 2/1991 | Colonias et al. | |
| 5,042,217 A | * 8/1991 | Bugbee et al. | 52/643 |
| 5,104,252 A | 4/1992 | Colonias et al. | |
| 5,109,646 A | 5/1992 | Colonias et al. | |
| 5,150,982 A | 9/1992 | Gilb | |
| 5,217,317 A | * 6/1993 | Young | 403/232.1 |
| 5,253,465 A | 10/1993 | Gilb | |
| 5,335,469 A | * 8/1994 | Stuart | 52/655.1 |
| 5,341,619 A | * 8/1994 | Dunagan et al. | 52/702 |
| 5,380,116 A | 1/1995 | Colonias | |
| 5,555,694 A | 9/1996 | Commins | |
| 5,564,248 A | * 10/1996 | Callies | 52/702 |
| 5,603,580 A | 2/1997 | Leek | |
| 5,670,076 A | 9/1997 | Leek | |
| 5,732,519 A | 3/1998 | Leek | |
| 5,797,694 A | * 8/1998 | Breivik | 403/231 |
| 5,813,182 A | 9/1998 | Commins | |
| 6,009,681 A | * 1/2000 | Kozloff | 52/712 |

OTHER PUBLICATIONS

HIB–91 Summary Sheet, Commentary and Recommendations for Handling, Installing & Bracing Metal Plate Connected Wood Trusses, Frames 1–6; Truss Plate Institute. Madison, Wisconsin Madison, Wisconsin.

Simpson Catalog No. 67HI Strong–Tie Joist Hangers and Framing Connectors pp. 1, 10 & 11. A. I. A. FILE No. 14–J. Simpson Co. Rough Carpentry Sep. 1974, Structural Designs & Load Values . . . Code Approved, Catalog #75H1 1975 pp. 1 and 18.

Simpson Co. Rough Carpentry Sep. 6, 1979, Strong–Tie Connectors . . . Code Approved Industry Preferred Catalog 80H–1 1980 pp. 1 and 13.

Simpson Co. Rough Carpentry Jan. 6, 1983, Strong–Tie Connectors, Catalog 83H–1 pp. 1 and 12.

Simpson Co. Rough Carpentry Jan. 6, 1982, Wood Framing Systems, Strong–Tie Connectors, Catalog # 82 H –1 pp. 1 and 25.

Simpson Strong–Tie Connectors, Product Use Guide for Simpler, stronger, Safer Construction, Catalog C–RPC87 Pages 1 and 12.

Simpson Strong–Tie Connectors, Do–It–Yourself Construction Connectors, Catalog C–DIY96, Jun. 1, 1996 pages 1 and 5.

Tanaka Steel Catalog, Tanaka Co., Ltd, Japan, published Jul. 1996, title page, page 28 and 29, cover page (4pages).

Simpson Strong–Tie Connectors, Wood Construction Connectors, No–Equal Structural Connectors, Catalog C–2000 Jan. 1, 2000 pages 11, 12, 23, 24, 29, 31, 32, 34, 35, 37, 49, 58, 61, 62, 85, 86, 89, 91, 97, 106, 108, 114, 116, 117.

Rob Thallon, Graphic Guide to Frame Construction, Details for builders and desiners, published Sep. 1991, (U.S.A.), title and end cover, page 129 and 150 (4pages).

* cited by examiner

VALLEY TRUSS CLIP

BACKGROUND OF THE INVENTION

This invention relates to improvements in building construction, providing a novel connection between two structural members with a connector that can be bent during installation so that a single connector can be used for a variety of possible angles of orientation between the structural members. The connector of the present invention has great utility when trusses are used to frame two intersecting roof planes.

The inside corner of two intersecting roof planes is called a valley. When rafters are used for the framing of the intersecting roof planes, the valleys are often supported by valley rafters that extend from the outside walls of the building to the ridge or header. Valley rafters support large loads and should be engineered. Jack rafters support the area between the valley rafter and the ridge or header.

In recent years, it has become commonplace to also build roofs with trusses rather than rafters. Framing a valley with trusses is a simple matter of attaching a series of progressively smaller trusses to the top chords of the trusses of the main roof. The main roof trusses do not have to be oversized since the only extra weight they will carry is the dead weight of the jack trusses themselves.

The smaller trusses that rest upon the trusses of the main roof are called valley jack trusses. One method taught in the prior art for connecting valley jack trusses to the top chords of the main roof trusses is to rip the bottom chords of the valley jack trusses to the slope of the main-roof pitch, and then toe-nail the bottom chords of the valley trusses to the top chords of the main roof trusses. Unfortunately, this has the draw back of requiring an extra operation to be performed on the valley jack trusses that cannot be performed until the slope of the main roof truss is known.

Another method practiced is to forego ripping the bottom chord. In this case, the toe-nail connection of the valley jack trusses can be less secure and often the trusses need to be propped up with shims or braces until the sheathing is placed on the top chords of the valley jack trusses.

The present invention provides an improved connection between a valley jack truss and a main roof truss where the connection is stable without ripping the bottom chord of the valley jack truss.

SUMMARY OF THE INVENTION

It is an object of the present invention to provide an improved connection between a first structural member and a second structural member, wherein the first structural members is disposed at an angle to the second structural member, and that angle is among a selected set of angles at which the same connector may be used to connect the two members by bending the connector to the desired position when the connection is made.

It is an object of the present invention to provide an improved connection between a valley jack truss and a main roof truss using a connector. The connector is formed with a base member and opposed side flanges, the base member of the connector attaches to the top chord of the main roof truss with fasteners, and the side flanges of the connector attach to opposed sides of the bottom chord of the valley jack truss.

It is a further object of the present invention to provide an improved connection between a valley jack truss and a main roof truss using a connector, wherein the connector can accommodate various roof pitches of the main roof truss without having to custom design the connector.

It is an object of the present invention to provide an improved connection between a first structural member and a second structural member using a connector. The connector is formed with a base member and opposed side flanges, the base member of the connector attaches to a side face of the first structural member with fasteners, and the side flanges of the connector attach to opposed sides of the second structural member.

It is a further object of the present invention to provide an improved connection between a first structural member and a second structural member using a connector, wherein the connector can accommodate various skewed angles between the first structural member and the second structural member without having to custom design the connector.

DETAILED DESCRIPTION OF THE PREFERRED EMBODIMENT

Figure 1:
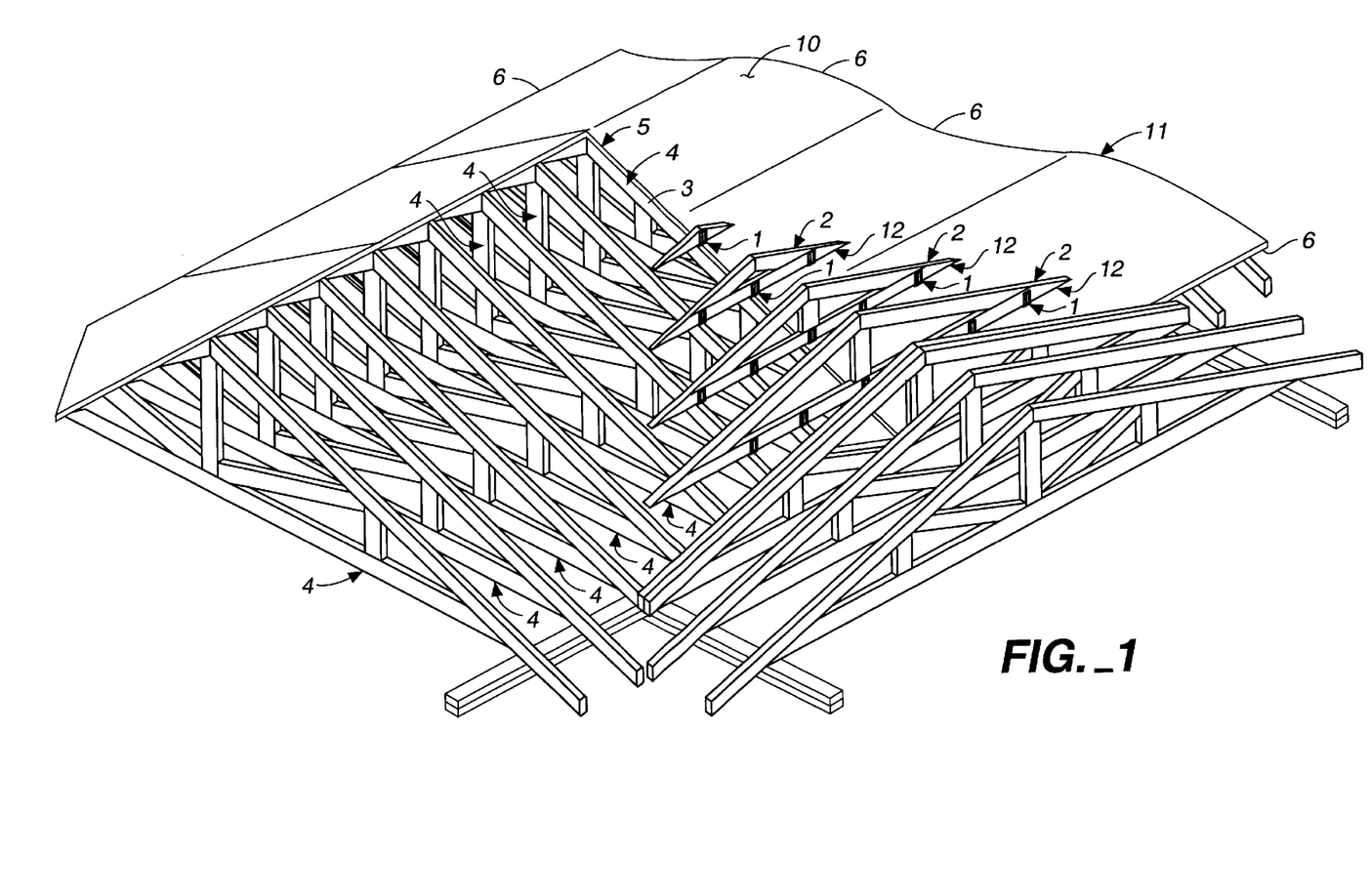
FIG. 1 is a perspective view of a roof having a series of main roof trusses with valley jack trusses attached to some of the main roof trusses according to the present invention.
Figure 10:
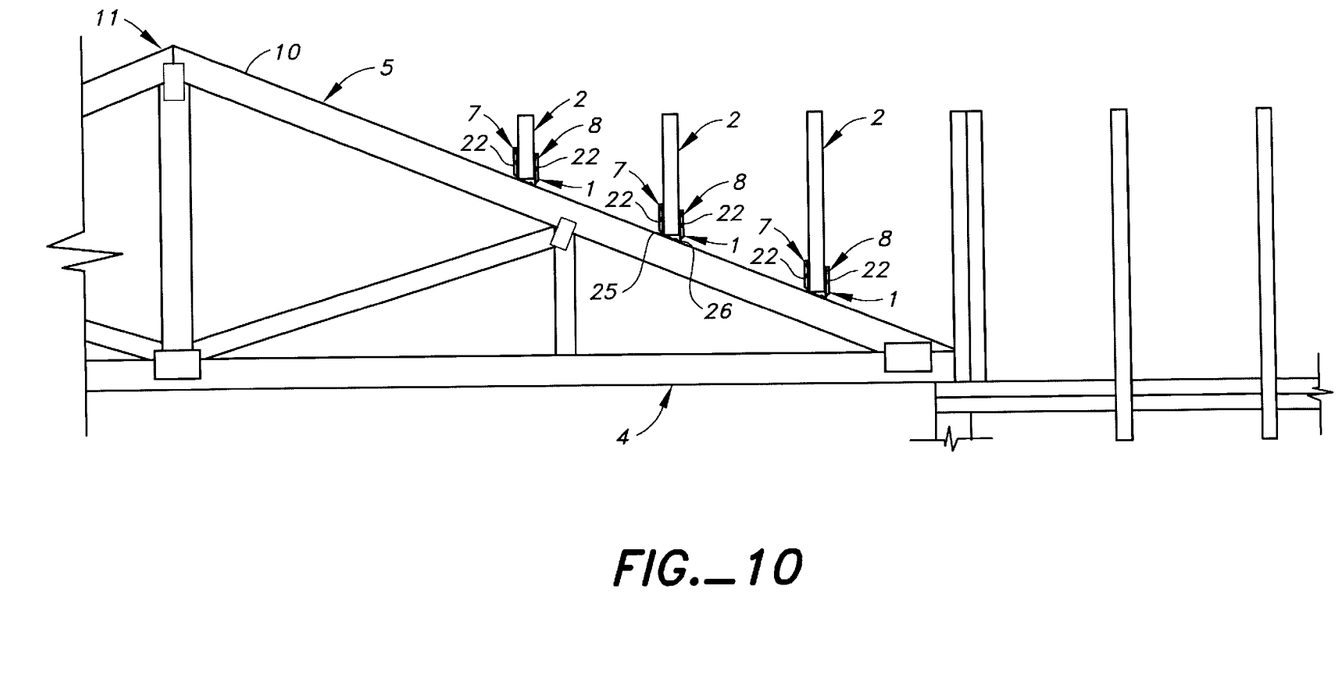
FIG. 10 is side view of a roof showing valley jack trusses attached to the top chord of a main roof truss, according to the present invention.

As is shown in FIGS. 1 and 10, in a first preferred embodiment of the present invention, the connector 1 is used to attach a valley jack truss 2 to the top chords 3 of a series of main roof trusses 4, the top chords 3 of the main roof trusses 4 defining a sloping roof plane or slope 5. As illustrated in FIG. 1, the valley jack truss 2 is attached to a series of aligned, main roof trusses 4 to which sheathing 6 is attached.

Figure 7:
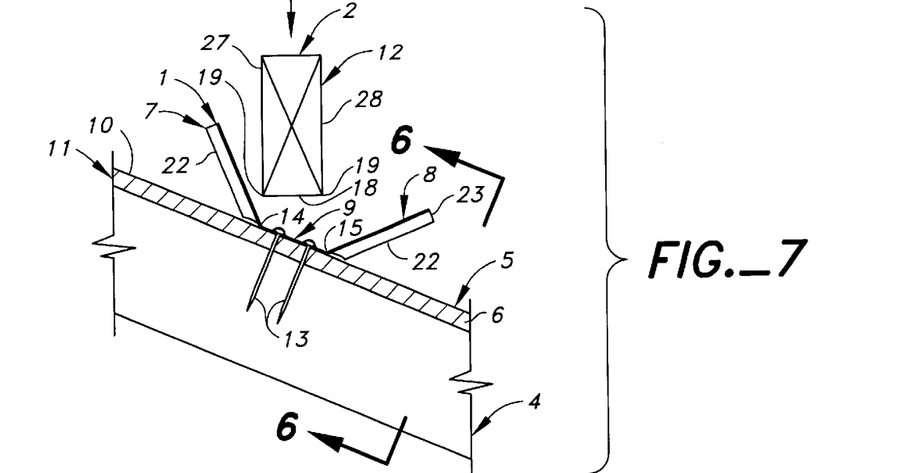
FIG. 7 is a side view of the formation of the connection of the present invention. The bottom chord of the valley jack truss is being shown moved towards the connector which has been attached to the top chord of a main roof truss.
Figure 8:
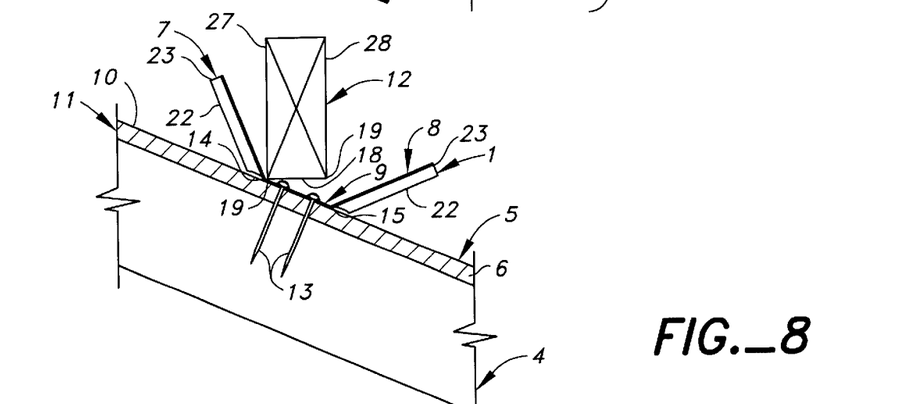
FIG. 8 is a side view of the formation of the connection of the present invention. The bottom chord of the valley jack truss is shown with an opposed, elongated edge of the bottom surface resting on the base member near one of the bend lines.
Figure 9:
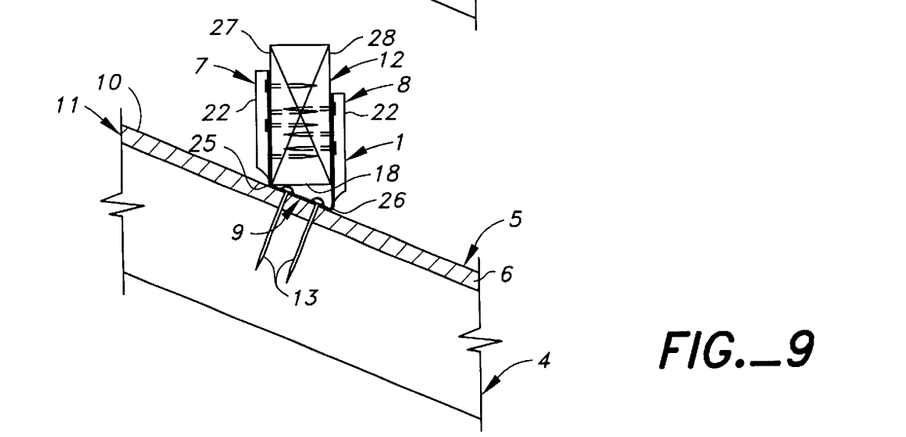
FIG. 9 is a side view of a connection formed according to the present invention between the bottom chord of a valley jack truss and the top chord of a main roof truss.

As is shown in FIGS. 7, 8 and 9, the connector 1 is designed so that the side flanges 7 and 8 of the connector 1 can be set at a variety of angles to the base member 9. In the first preferred embodiment, the ability to vary the angle of the side flanges 7 and 8 with respect to the base member 9, allows the valley jack truss 2 to be held in an upright orientation, even though the top surface 10 of the roof 11 is sloped.

As is shown in FIG. 7, in the first preferred embodiment, the connector 1 has a base member 9 that rests on and is attached to the top surface 10 of the roof 11. The top surface 10 of the roof 11 is often defined by sheathing 6 covering the main roof trusses 4 entirely.

As is shown in FIG. 1, in the preferred embodiment, the connection is made with a first main roof truss 4 that has a first top chord 3. The first main roof truss 4 is one of a series of main roof trusses 4 disposed in parallel relation, each of the main roof trusses 4 having at least one top chord 3, the top chords 3 defining a sloping roof plane 5

As is also shown in FIG. 1, in the preferred embodiment, the connection is also made with a first valley jack truss 2, having a first bottom chord 12. The first valley jack truss 2 is one of a parallel series of valley jack trusses 2 having bottom chords 12. The series of valley jack trusses 2 is supported by the top chords 3 of the main roof trusses 4, and the bottom chords 12 of the valley jack trusses 2 are set at an angle to the top chords 3 of the main roof trusses 4 with the valley jack trusses 2 getting progressively smaller as the valley jack trusses 2 are positioned higher up on the sloping roof plane 5.

As is shown in FIG. 7, in the preferred embodiment, the connection is also made with a connector 1 attaching the first bottom chord 12 of the first valley jack truss 2 to the first top chord 3 of the first main roof truss 4 in combination with fasteners 13. The preferred connector 1 is formed with a base member 9, the base member 9 receiving a select number of the fasteners 13 which are also received by the first top chord 3 of the first main roof truss 4. The fasteners 13 provide a positive attachment between the connector 1 and the main roof truss 4. The preferred connector 1 is also formed with opposed side flanges 7 and 8 that are disposed laterally of the base member 9 and connect to the base member 9 along parallel bend lines 14 and 15. The side flanges 7 and 8 also receive a select number of the fasteners 13 which are also received by the first bottom chord 12 of the first valley jack truss 2, making a positive attachment between the connector 1 and the valley jack truss 2.

The base member 9 is preferably attached to the top surface 10 of the roof 11 by driving nails 13 through openings in the base member 9. The same fasteners 13 that attach the base member 9 to the sheathing 6 pass through the sheathing 6 and enter the top chords 3 of the main roof trusses 4.

Figure 6:
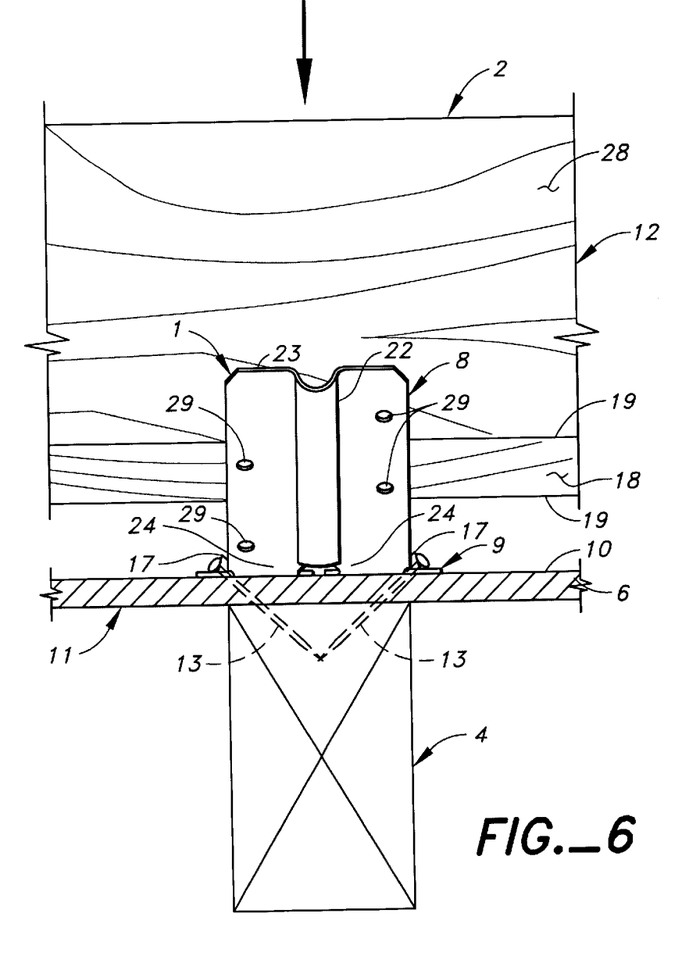
FIG. 6 is an end view of the formation of the connection of the present invention taken along line 6—6 of FIG. 7.

As is shown in FIG. 6, preferably, the nails 13 are driven at a skewed angle to the base member 9 through base member fastener openings 16.

Preferably, the openings 16 for receiving the nails 13 are formed with positive angle fastener devices 17 as described in U.S. Pat. No. 5,603,580, granted to William F. Leek, the specification of which is incorporated herein by reference. The positive angle fastener devices or domes 17 do not interfere with the bottom surface 18 of the bottom chord 12 of the valley jack truss, since only an elongated edge 19 of the bottom surface 18 of the bottom chord 12 of the valley jack truss 2 rests on the base member 9. The bottom surface 18 of the bottom chord 12 of the valley jack truss 2 lies at an angle to the base member 9 which is in registration with the top surface 10 of the roof 11.

Figure 2:
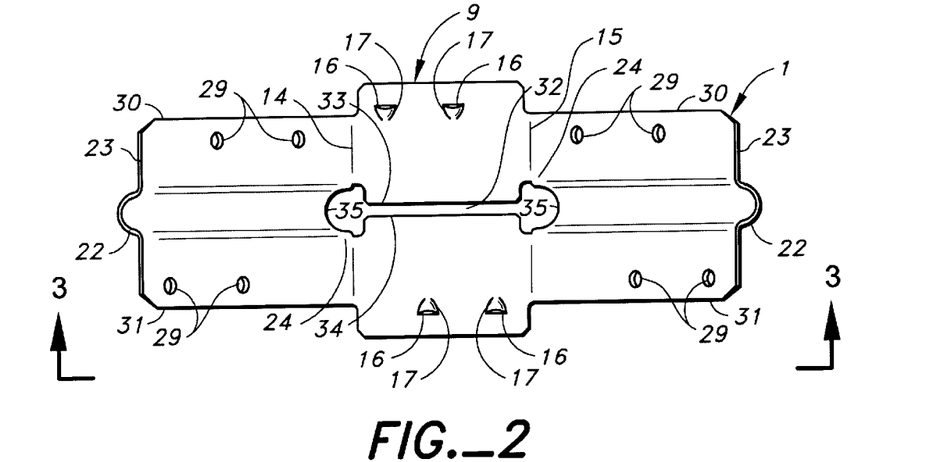
FIG. 2 is a top view of the connector of the present invention.
Figure 3:
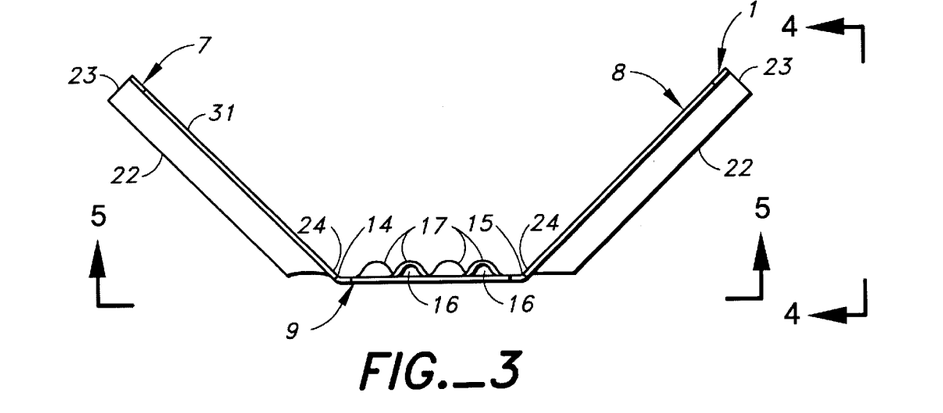
FIG. 3 is a side view of the connector of the present invention taken along line 3—3 of FIG. 2.
Figure 4:
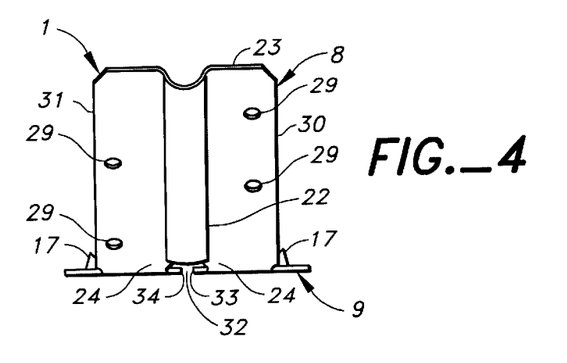
FIG. 4 is an end view of the connector of the present invention taken along line 4—4 of the present invention.

As is shown in FIGS. 2, 3 and 4, first and second side flanges 7 and 8 are attached to opposed sides of the base member 9 at first and second bend lines 14 and 15.

In the preferred embodiment, when the bottom chord 12 of the valley jack truss 2 is expected to be 1.562 inches wide, the side flanges 7 and 8 of the connector 1 are pre-bent up from the base member 9 a selected angle of 45 degrees along parallel bend lines 14 and 15 set 1.694 inches away from each other, creating a base member 9 that is 1.694 inches wide. The connector 1 is pre-bent at the factory, so that the dimension of the base member 9 is optimized for use with a particular width bottom chord 12 of the valley jack truss 2. The factory pre-bending also makes it easier to complete the final bending of the side flanges 7 and 8 with respect to the base member 9 in the field, and to initially attach the base member 9 of the connector 1 to the top chord 3 of the main roof truss 4. With these dimensions, the connector 1 is optimized to work in a range of roof pitches from $3/12$ to $6/12$, with $5/12$ being the most common. The connector 1 will also work well in a range of roof pitches from $2/12$ to $12/12$ with a bottom chord that is 1.562 inches wide. The connector 1 can also be used to make the connection between two structural members disposed at angles from 45 degrees to as much as 90 degrees.

As is show in FIGS. 2, 3, 4 and 5, the first and second side flanges 7 and 8 are formed with channels 22 to strengthen the first and second side flanges 7 and 8. The channels 22 of the side flanges 7 and 8 extend in lateral relation to the bend lines 14 and 15 that separate the base member 9 from the opposed side flanges 7 and 8 , and in the preferred embodiment, the channels 22 extend in perpendicular relation to the first and second bend lines 14 and 15. These channels 22 are formed by drawing the material of the side flanges 7 and 8. The preferred channel-section is a relatively deep arc, the arc extending approximately 180 degrees. The channels strengthen the side flanges 7 and 8, so that when the connector 1 is bent in the field, the connector 1 will bend at the bend lines 14 and 15 between the base member 9 and the side flanges 7 and 8.

Preferably these channels 22 extend from the outer lateral edges 23 of the side flanges 7 and 8 substantially across the side flanges 7 and 8, extending almost to the bend lines 14 and 15 defining the boundary of the base member 9 with the side flanges 7 and 8. Preferably, the channels 22 end approximately .125 inches away from the first and second bend lines 14 and 15. By creating a portion of each side flange 7 or 8 that is not strengthened by the channels 22, flexible interconnecting sections 24 are created in the side flanges 7 and 8 adjacent the first and second bend lines 14 and 15.

These flexible interconnecting sections 24 allow the valley jack truss 2 to be set on even steeper pitches than $6/12$. By creating a section of material near each bend line 14 or 15 that is comparatively easy to bend with respect to the other portions of the connector 1, when it comes time to bend the connector 1 to its final position, each of the bends 25 and 26 at the bend lines 14 and 15 can be formed with a relatively large radii. In the sloped roof 11 application, having an uphill bend 25 and a downhill bend 26, where the uphill bend 25 is bent through a smaller angle than the downhill bend 26, the large radius of the small-angle uphill bend 25 effectively widens the connector 1. In comparison, the large radius of the downhill bend 26 allows the connector 1 to be more easily bent to the large angle past 90 degrees necessary for the skewed installation.

In the first preferred embodiment, the first and second side flanges 7 and 8 extend vertically along the first and second side surfaces 27 and 28 of the bottom chord 12 of the valley jack truss 2 and are secured thereto by fasteners 13, which are preferably nails 13, sized for the bottom chord 12 of the valley jack truss 2.

In making the connection between a valley jack truss 2 and one or more main roof trusses 4, a connector 1 is first attached to the top chord 3 of as many main roof truss 4 as is needed to adequately secure the valley jack truss 2. As shown in FIG. 1, as the valley jack trusses 2 get progressively smaller, fewer connectors 1 can be used.

The connectors 1 are set in a line at the same elevation on the selected main roof trusses 4. The connectors 1 are preferably fastened with nails 13 driven through positive angle fastening 17 devices in the base member 9, through the sheathing 6 applied to the top chords 3 of the main roof trusses 4 and into the top chords 3 of the main roof trusses 4.

Figure 5:
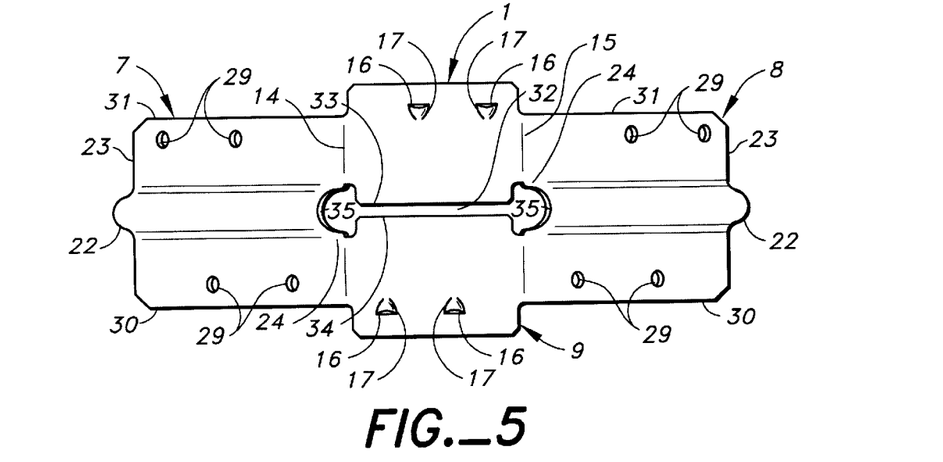
FIG. 5 is a bottom view of the connector of the present invention taken along line 5—5 of the present invention.

The valley jack truss 2 is then aligned with the connector 1 or connectors 1 and lowered to rest with one elongated edge 19 of the bottom chord 12 of the valley jack truss 2 resting on the portion of the base member 9 adjacent the uphill bend 25. See FIGS. 5 and 6. As is shown in FIGS. 5, 6 and 7 the valley jack truss 2 is aligned vertically and at an angle to the slope 5 of the roof 11. The side flanges 7 and 8 are then bent to register with the opposed side surfaces 27 and 28 of the bottom chord 12 of the valley jack truss 2. This can be accomplished by striking the side flanges 7 and 8 with a hammer on their lateral channels 22 to bend them upward. Nails 13 are then driven through the nail openings 29 in the side flanges 7 and 8 and into the bottom chord 12 of the valley jack truss 2, securing the valley jack truss 2 to one of the top chords 3 of one the main roof trusses 4.

In the preferred embodiment, the connector 1 is formed from 18 gauge galvanized sheet metal. The following is a description of the formation of the connector 1 from sheet metal.

In the preferred embodiment, when the bottom chord 12 of the valley jack truss 2 is expected to be 1.562 inches wide, before the channel shape is drawn in the side flanges 7 and 8, the side flanges 7 and 8 can be considered to have parallel, laterally extending side edges 30 and 31 that are spaced 2.0750 inches away from each other.

Early in the cutting of the preferred blank, an elongated lateral opening 32 is formed at the center of the blank. The elongated lateral opening 32 extends the width of the base member 9 with parallel side edges 33 and 34 that are spaced 0.3850 inches apart. The elongated lateral opening 32 extends into each side flange 7 and 8, opening outwardly so that sides of the opening are spaced 0.75 inches apart at their widest; however, the elongated lateral opening 32 quickly ends in arced end edges 35 after it widens.

The nail openings 29 in the side flanges 7 and 8 are also formed during the cutting of the blank. In the preferred embodiment, the nail openings 29 in the side flanges 7 and 8 are positioned so that none of the nails 13 are spaced too close to each other in the most common roof installations.

In making the preferred embodiment, the central lateral material of the side flanges 7 and 8 is drawn out of the planes defining the side flanges 7 and 8, forming the lateral channels 22. In the preferred embodiment, the lateral channels 22 have an arc-shaped cross-section. This has the effect of narrowing the part, and when the connector 1 is finished being pre-bent and formed, the laterally extending side edges 30 and 31 of the side flanges 7 and 8 are only 1.8125 inches apart, and the elongated lateral opening 32 is much narrower.

Preferably, in making the connector 1, the side flanges 7 and 8 are pre-bent a selected angle of 45 degrees from the base member 9.

In the preferred embodiment, the elongated lateral opening 32 can be used to align the connector 1 with a line drawn on the top surface 10 of the roof 11, marking the location of the top chord 3 of a main roof truss 4. 8.

Figure 11:
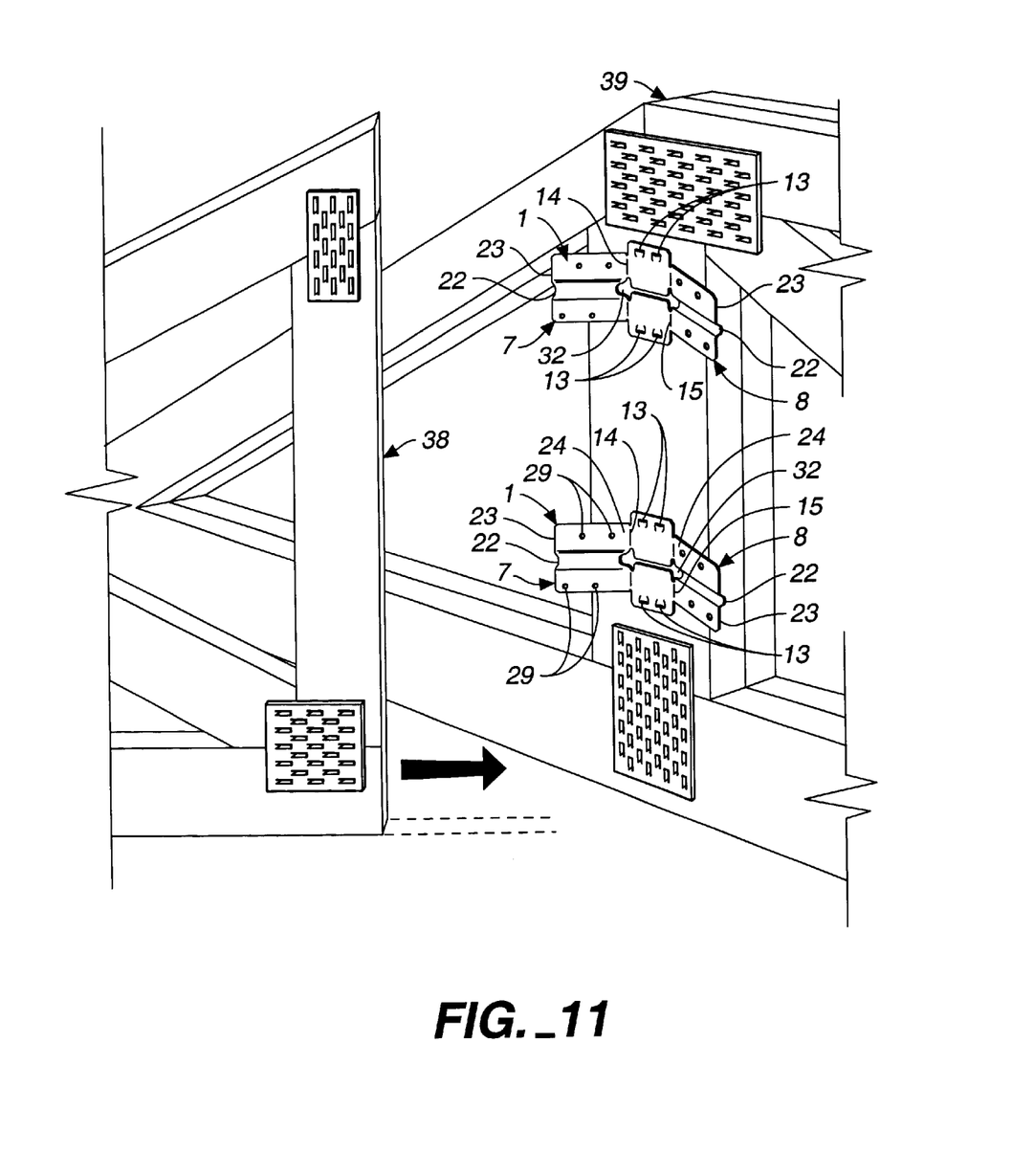
FIG. 11 is a perspective view of the formation of a connection between a horizontally disposed truss that is to be set in skewed relation to a second horizontally disposed truss.

While the preferred embodiment has been discussed in terms of a connection between a valley jack truss 2 set on sloping main roof trusses 4, as is shown in FIG. 11 the connector 1 is also ideal for attaching first horizontally disposed truss 38 in skewed relation to a second horizontally disposed truss 39. The formation of such a connection is similar to that for connecting a valley jack truss 2 to a main roof truss 4, and is not described here.

Figure 12:
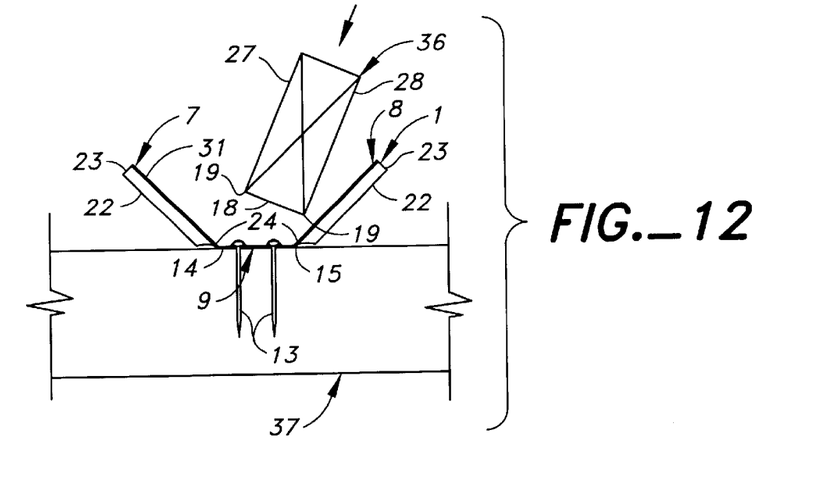
FIG. 12 is a side view of the formation of the connection of the present invention between a joist or second structural member and a header or first structural member. The joist is being shown moved towards the connector which has been attached to the header.
Figure 13:
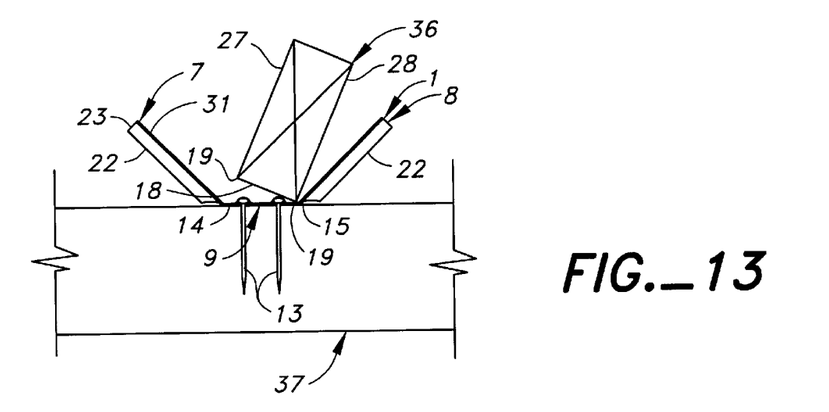
FIG. 13 is a side view of the formation of the connection of the present invention between a joist or second structural member and a header or first structural member. The joist is shown with an opposed, elongated edge of the bottom surface touching the base member near one of the bend lines.
Figure 14:
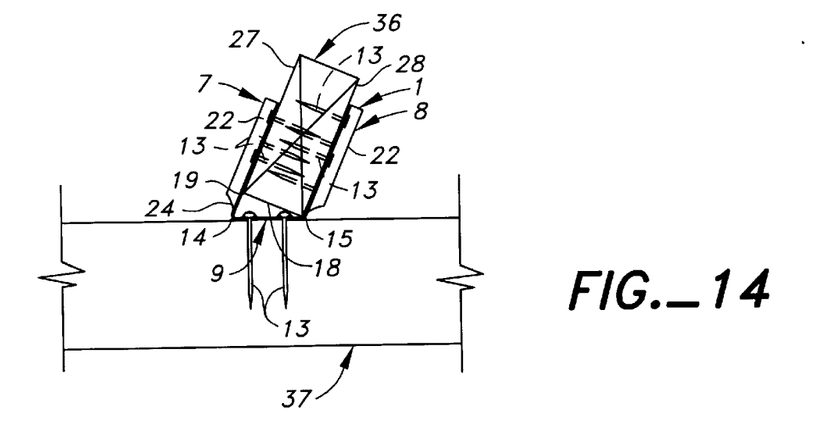
FIG. 14 is a side view of a connection formed according to the present invention between a joist or second structural member and a header or first structural member.

As is shown in FIGS. 12, 13 and 14 the connector 1 is also ideal for setting a joist 36 in skewed relation to a header 37, and in fact the joist 36 can also be set at a slant to the header 37. The formation of such a connection is similar to that for connecting a valley jack truss 2 to a main roof truss 4.

According to the present invention, a connection can also be made between a first structural member 37 and a second structural member 36. The second structural member 36 has a bottom surface 18 that lies adjacent the first structural member 37, and the bottom surface 18 is formed with opposed, elongated edges 19. The second structural member 36 is also formed with opposed side surfaces 27 and 28.

The connector 1, attaching the second structural member 36 to the first structural member 37 in combination with fasteners 13, is preferably formed with a base member 9, and the base member 9 receives a select number of the fasteners 13 which are also received by the first structural member 37, making a positive attachment between the connector 1 and the first structural member 37. In the preferred embodiment, the base member 9 is formed with an elongated lateral opening 32.

In the preferred embodiment, the connector 1 is also formed with opposed side flanges 7 and 8 that are disposed laterally of the base member 9 and connect to the base member 9 along parallel bend lines 14 and 15. The side flanges 7 and 8 receive a select number of the fasteners 13 which are also received by the second structural member 36, making a positive attachment between the connector 1 and the second structural member 36. The side flanges 7 and 8 register with the opposed side surfaces 27 and 28 of the second structural member 36, and the second structural member 36 is disposed so that only one of the opposed, elongated edges 19 of the bottom surface 18 of the second structural member 36 contacts the base member 9 adjacent one of the bend lines 14 and 15 separating the base member 9 from the side flanges 7 and 8. In the preferred embodiment, the side flanges 7 and 8 of the connector 1 are formed with flexible interconnecting sections 24 adjacent the first and second bend lines 14 and 15, the flexible interconnecting sections 24 being more easily bent parallel to the bend lines 14 and 15 than the remainder of the side flanges 7 and 8. In the preferred embodiment, the opposed side flanges 7 and 8 are also formed with channels 22 that strengthen the side flanges 7 and 8. The channels 22 of the side flanges 7 and 8 extend in lateral relation to the bend lines 14 and 15 that separate the base member 9 from the opposed side flanges 7 and 8. Furthermore, in the preferred embodiment, the side flanges 7 and 8 are formed with lateral edges 23, and the channels 22 extend from the outer lateral edges 23 of the side flanges 7 and 8 almost to the bend lines 14 and 15 that separate the base member 9 from the opposed side flanges 7 and 8, and the channel 22 is formed as a relatively deep arc in cross-section that extends approximately 180 degrees, although other cross-sectional shapes are possible, but not preferred.

We claim:

1. A connect comprising:
   a. a first main roof truss, the first main roof truss having a first top chord, the first main roof truss being one of a series of main roof trusses disposed in parallel relation, each of the main roof trusses having at least one top chord, the top chords defining a sloping roof plane;
   b. a first valley jack truss having a first bottom chord, the first valley jack truss being one of a parallel series of valley jack trusses having bottom chords, the series of valley jack trusses being supported by the top chords of the main roof trusses, the bottom chords of the valley jack trusses being set at an angle to the top chords of the main roof trusses and the valley jack trusses getting progressively smaller as the valley jack trusses are positioned higher up on the sloping roof plane;
   c. a connector,
      1. the connector attaching the first bottom chord of the first valley jack truss to the first top chord of the first main roof truss in combination with fasteners;
      2. the connector being formed with a base member having an elongate lateral opening, the base member receiving a select number of the fasteners which are also received by the first top chord of the first main roof truss, making positive attachment between the connector and the main roof truss;
      3. the connector also being formed with opposed side flanges that are disposed laterally of the base member and connect to the base member along parallel bend lines, the side flanges receiving a select number of the fasteners which are also received by the first bottom chord of the first valley jack truss, making positive attachment between the connector and the valley jack truss wherein the opposed side flanges are formed with channels that strengthen the side flanges.

2. The connection of claim 1, wherein the channels of the side flanges extend in lateral relation to the bend lines that separate the base member from the opposed side flanges.

3. The connection of claim 2, wherein the side flanges are formed with outer lateral edges, and the channels extend from the outer lateral edges of the side flanges almost to the bend lines that separate the base member from the opposed side flanges.

4. The connection of claim 3, wherein the channel is formed as a relatively deep arc.

5. The connection of claim 4, wherein the arc of the channel extends approximately 180 degrees.

6. The connection of claim 1, wherein the bottom chord of the valley roof truss is formed with a bottom surface having opposed, elongated edges and where said valley roof truss rests with only one of the opposed, elongated edges of the bottom chord on the base member.

7. The connection of claim 6, wherein the opposed, elongated edge of the bottom chord of the valley jack truss resting on the base member sits adjacent to the bend line between the base member and side flange that is disposed higher on the sloping roof plane than the other opposed side flange.

8. The connection of claim 1, wherein the bottom chord of the valley jack truss is formed with opposed side surfaces, and the opposed side flanges register with the side surfaces of the bottom chord of the valley jack truss.

9. The connection of claim 1, further comprising sheathing disposed between the base member of the connector and the top chord of the main roof truss, and the fasteners are driven through the base member, through the sheathing applied to the top chord of the main roof truss and into the top chord of the main roof truss.

10. The connection of claim 1, wherein the side flanges of the connector are formed with flexible interconnecting sections adjacent the first and second bend lines, the flexible interconnecting sections being more easily bent parallel to the bend lines than the remainder of the side flanges.

11. The connection of claim 6, wherein the opposed side flanges are formed with channels that strengthen the side flanges.

12. The new connection of claim 11, wherein the channels of the side flanges extend in lateral relation to the bend lines that separate the base member from the opposed side flanges.

13. The connection of claim 12, wherein the side flanges are formed with outer lateral edges, and the channels extend from the outer lateral edges of the side flanges almost to the bend lines that separate the base member from the opposed side flanges.

14. The new connection of claim 13, wherein the channel is formed as a relatively deep arc.

15. The connection of claim 14, wherein the arc of the channel 35 extends approximately 180 degrees.

16. The connection of claim 8, wherein the opposed side flanges are formed with channels that strengthen the side flanges.

17. The connection of claim 16, wherein the channels of the side flanges extend in lateral relation to the bend lines that separate the base member from the opposed side flanges.

18. The connection of claim 17, wherein the side flanges are formed with outer lateral edges, and the channels extend from the outer lateral edges of the side flanges almost to the bend lines that separate the base member from the opposed side flanges.

19. The connection of claim 18, wherein the channel is formed as a relatively deep arc.

20. The connection of claim 19, wherein the arc of the channel extends approximately 180 degrees.

21. The connection of claim 9, wherein the opposed side flanges are formed with channels that strengthen the side flanges.

22. The connection of claim 21, wherein the channels of the side flanges extend in lateral relation to the brand lines that separate the base member from the opposed side flanges.

23. The connection of claim 20, wherein the side flanges are formed with outer lateral edges, and the channels extend from the outer lateral edges of the side flanges almost to the bend lines that separate the base member from the opposed side flanges.

24. The connection of claim 23, wherein the channel is formed as a relatively deep arc.

25. The connection of claim 24, wherein the arc of the channel extends approximately 180 degrees.

26. The connection of claim 10, wherein the opposed side flanges are formed with channels that strengthen the side flanges.

27. The connection of claim 26, wherein the channels of the side flanges extend in lateral relation member from the opposed side flanges.

28. The connection of claim 27, wherein the side flanges are formed with outer lateral edges, and the channels extend from the outer lateral edges of the side flanges almost to the bend lines that separate the base member from the opposed side flanges.

29. The connection of claim 28, wherein the channel is formed as a relatively deep arc.

30. The connection of claim 29, wherein the arc of the channel extends approximately 180 degrees.

31. A connection comprising:
   a. a first structural member;
   b. a second structural member having a bottom surface adjacent the first structural member, the bottom surface having opposed, elongated edges, said second structural member also being formed with opposed side surfaces;
   c. a connector,
      1. the connector attaching the second structural member to the first structural member in combination with fasteners;
      2. the connector being formed with a base member, the base member receiving a select number of the fasteners which are also received by the first structural member, making a positive attachment between the connector and the first structural member, the base member being formed with an elongated lateral opening;
      3. the connector also being formed with opposed side flanges that are disposed laterally of the base member and connect to the base member along parallel bend lines, the side flanges receiving a select number of the fasteners which are also received by the second structural member, making a positive attachment between the connector and the second structural member, the side flanges registering with the opposed side surfaces of the second structural member, and the second structural member is disposed so that only one of the opposed, elongated edges of the bottom surface of the second structural member contacts the base member adjacent one of the bend lines separating the base member from the side flanges, and wherein the side flanges of the connector are formed with flexible interconnecting sections adjacent the first and second bend lines, the flexible interconnecting sections being more easily bent parallel to the bend lines than the remainder of the side flanges, and wherein the opposed side flanges are formed with channels that strengthen the side flanges, the channels of the side flanges extending in lateral relation to the bend lines that separate the base member from the opposed side flanges, and wherein the side flanges are formed with outer lateral edges, and the channels extend from the outer lateral edges of the side flanges almost to the bend lines that separate the base member from the opposed side flanges, and wherein the channel is formed as a relatively deep arc that extends approximately 180 degrees.

* * * * *

UNITED STATES PATENT AND TRADEMARK OFFICE
CERTIFICATE OF CORRECTION

PATENT NO. : 6,840,020 B2
DATED : January 11, 2005
INVENTOR(S) : William F. Leek et al.

It is certified that error appears in the above-identified patent and that said Letters Patent is hereby corrected as shown below:

Column 8,
Line 39, replace "channel 35 extends" with -- channel extends --.
Line 60, replace "brand" with -- bend --.
Line 63, replace "20" with -- 22 --.

Column 9,
Line 9, replace "relation member" with -- relation to the bend lines that separate the base member --.

Signed and Sealed this

Eighth Day of March, 2005

JON W. DUDAS
*Director of the United States Patent and Trademark Office*